(12) United States Patent
Douglas, Jr. et al.

(10) Patent No.: US 11,004,082 B2
(45) Date of Patent: May 11, 2021

(54) TRUST PLATFORM

(71) Applicant: Capital One Services, LLC, McLean, VA (US)

(72) Inventors: Lawrence Hutchison Douglas, Jr., McLean, VA (US); Yolanda Liu, Arlington, VA (US); Clayton Johnson, Edgewood, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/146,613

(22) Filed: Sep. 28, 2018

(65) Prior Publication Data

US 2020/0104850 A1     Apr. 2, 2020

(51) Int. Cl.
| | |
|---|---|
| G06Q 20/40 | (2012.01) |
| G06Q 20/24 | (2012.01) |
| G06Q 20/32 | (2012.01) |
| G06Q 40/02 | (2012.01) |
| H04L 29/06 | (2006.01) |

(52) U.S. Cl.
CPC ......... G06Q 20/4016 (2013.01); G06Q 20/24 (2013.01); G06Q 20/325 (2013.01); G06Q 40/025 (2013.01); H04L 63/101 (2013.01)

(58) Field of Classification Search
CPC ..... H04L 63/10; H04L 63/20; H04L 63/1416; H04L 63/1441; H04L 63/14; H04L 63/1408; H04L 67/22; H04L 9/321; G06Q 20/4016; G06Q 20/325
See application file for complete search history.

(56) References Cited

U.S. PATENT DOCUMENTS 10,395,250 B2    8/2019 Bailey, Jr.
2006/0230278 A1 * 10/2006 Morris ................ H04L 63/1433
                                                                 713/182

(Continued)

FOREIGN PATENT DOCUMENTS

WO    WO 2007/148069        12/2007
WO    WO-2018185521 A1 * 10/2018 ........... H04L 63/102

OTHER PUBLICATIONS

Extended European Search Report for Application No. EP19199775.8, dated Feb. 24, 2020, 12 pages.

*Primary Examiner* — Rajesh Khattar
*Assistant Examiner* — Carol A See
(74) *Attorney, Agent, or Firm* — Harrity & Harrity, LLP

(57) ABSTRACT

A first user device may receive, from a second user device, a request to communicatively couple to the first user device, and may establish a communication session with the second user device after receiving the request. The first user device may identify, after establishing the communication session, an inappropriate activity of the second user device relating to the communication session, and perform a set of actions based on identifying the inappropriate activity. The set of actions may include causing the communication session to be restricted, and providing, to a trust platform, a score for the second user device. The score may permit the trust platform to derive a composite score, indicative of a level of trustworthiness of the second user device, that enables other user devices, associated with the trust platform, to determine whether to grant access requests submitted by the second user device.

21 Claims, 8 Drawing Sheets

(56) References Cited

U.S. PATENT DOCUMENTS

| | | | |
|---|---|---|---|
| 2008/0201464 A1* | 8/2008 | Campbell | H04L 29/06 709/224 |
| 2010/0004965 A1* | 1/2010 | Eisen | G06Q 10/00 705/318 |
| 2012/0209970 A1* | 8/2012 | Scipioni | G06Q 30/06 709/223 |
| 2012/0233665 A1* | 9/2012 | Ranganathan | G06F 21/51 726/4 |
| 2014/0250496 A1 | 9/2014 | Amidon et al. | |
| 2015/0326594 A1* | 11/2015 | Chari | H04L 63/1425 726/23 |
| 2015/0363581 A1 | 12/2015 | Ranadive et al. | |
| 2016/0036833 A1 | 2/2016 | Ardeli et al. | |
| 2016/0165449 A1* | 6/2016 | Poisner | H04L 63/10 726/4 |
| 2017/0126705 A1 | 5/2017 | Mirashrafi et al. | |
| 2017/0171231 A1* | 6/2017 | Reybok, Jr. | H04L 63/14 |
| 2017/0324733 A1* | 11/2017 | Howry | G06F 21/577 |
| 2017/0331828 A1* | 11/2017 | Caldera | H04L 63/0807 |
| 2018/0122004 A1 | 5/2018 | Stewart | |

* cited by examiner

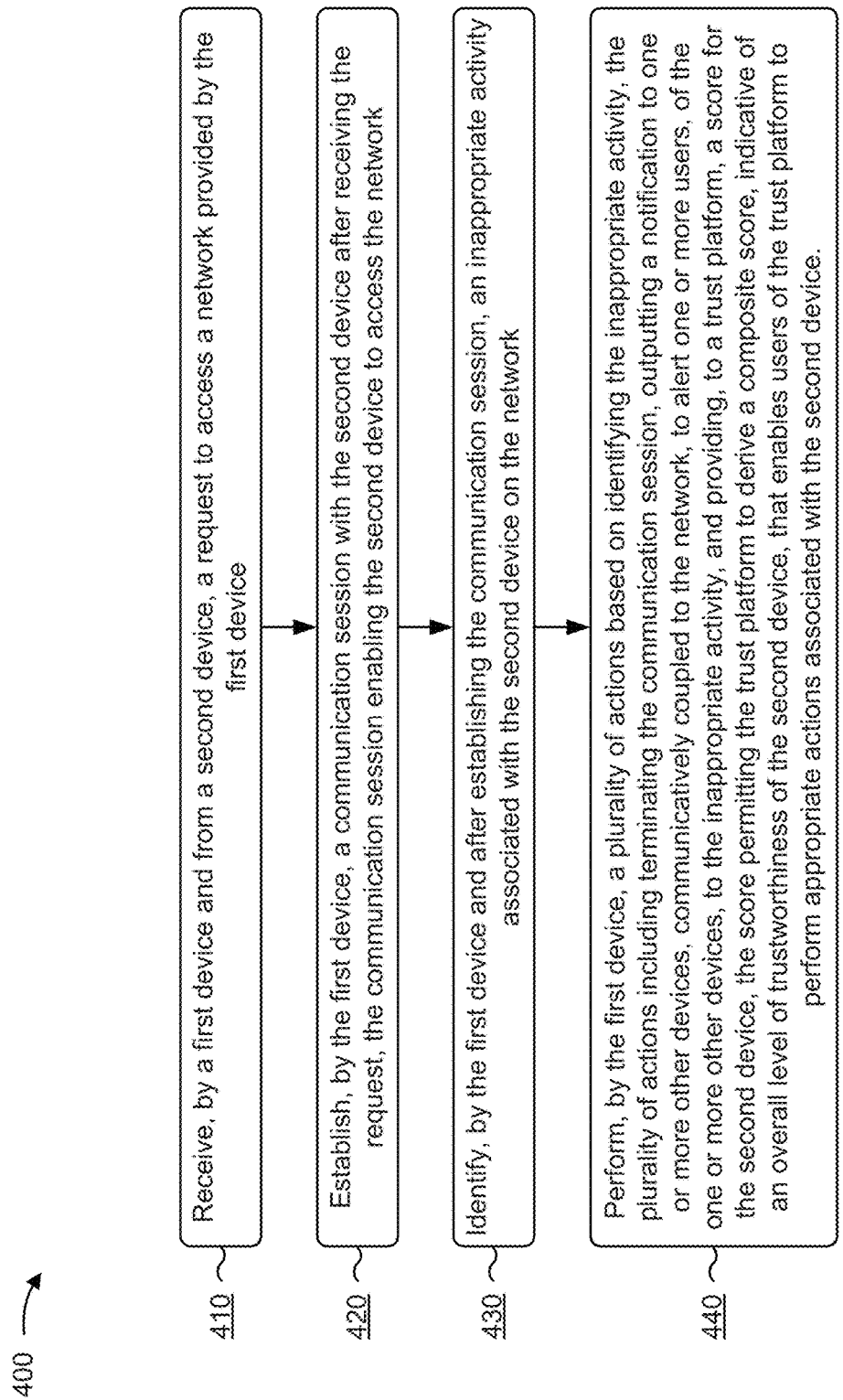

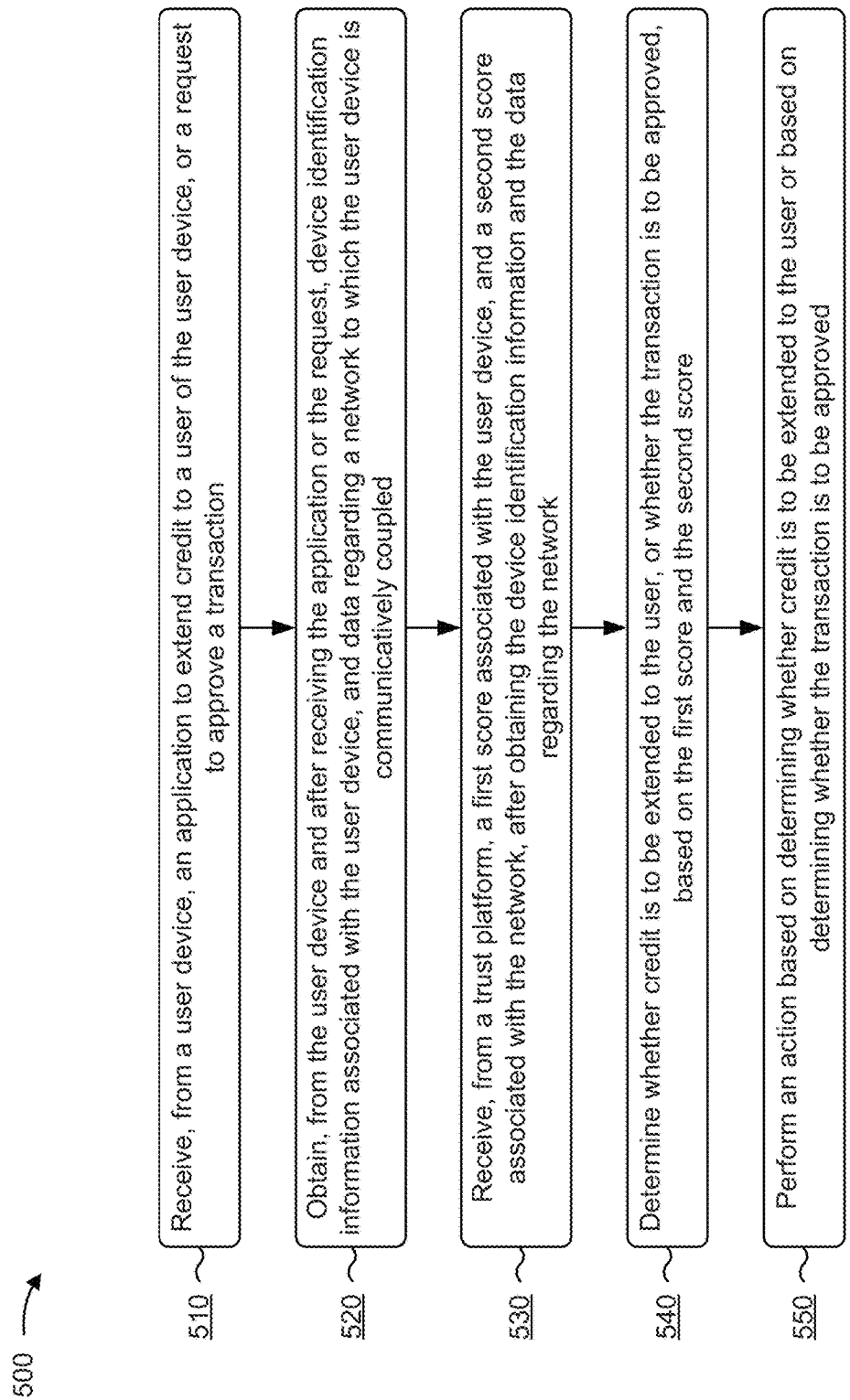

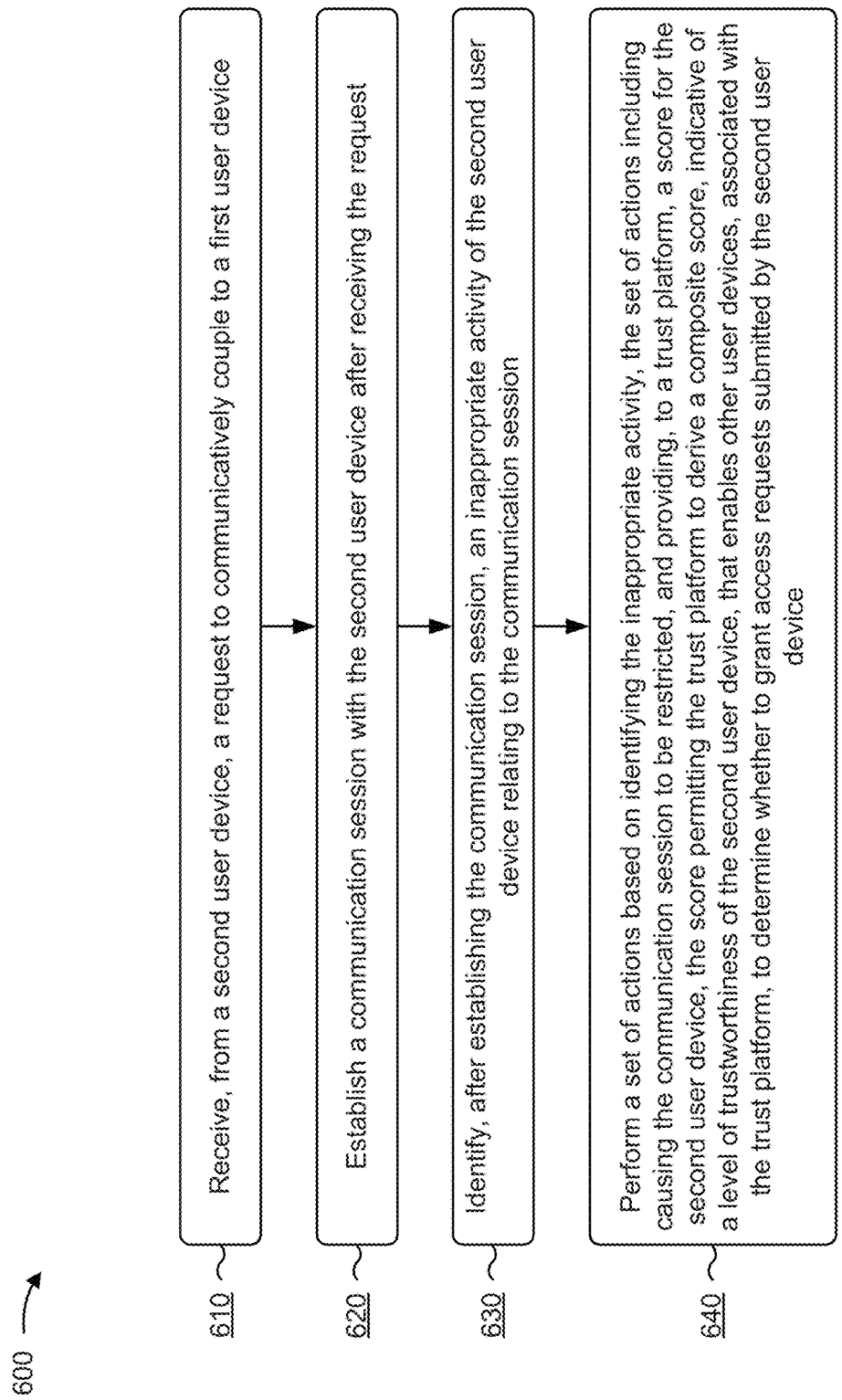

US 11,004,082 B2

TRUST PLATFORM

BACKGROUND

Users often connect user devices to other devices, or to networks, such as publicly accessible wireless local area networks (e.g., Wi-Fi hotspots and/or the like), provided by other devices. Users also conduct transactions (e.g., over the Internet) when connected to these networks.

SUMMARY

According to some possible implementations, a method may include receiving, by a first device and from a second device, a request to access a network provided by the first device, and establishing, by the first device, a communication session with the second device after receiving the request. The communication session may enable the second device to access the network. The method may include identifying, by the first device and after establishing the communication session, an inappropriate activity associated with the second device on the network, and performing, by the first device, a plurality of actions based on identifying the inappropriate activity. The plurality of actions may include terminating the communication session, outputting a notification to one or more other devices, communicatively coupled to the network, to alert one or more users, of the one or more other devices, to the inappropriate activity, and providing, to a trust platform, a score for the second device. The score may permit the trust platform to derive a composite score, indicative of an overall level of trustworthiness of the second device, that enables users of the trust platform to perform appropriate actions associated with the second device.

According to some possible implementations, a device may include one or more memories, and one or more processors, communicatively coupled to the one or more memories, configured to receive, from a user device, an application to extend credit to a user of the user device, or a request to approve a transaction. The one or more processors may obtain, from the user device and after receiving the application or the request, device identification information associated with the user device, and data regarding a network to which the user device is communicatively coupled. The one or more processors may receive, from a trust platform, a first score associated with the user device, and a second score associated with the network, after obtaining the device identification information and the data regarding the network, and determine whether credit is to be extended to the user, or whether the transaction is to be approved, based on the first score and the second score. The one or more processors may perform an action based on determining whether credit is to be extended to the user or based on determining whether the transaction is to be approved.

According to some possible implementations, a non-transitory computer-readable medium may store instructions that include one or more instructions that, when executed by one or more processors of a first user device, cause the one or more processors to receive, from a second user device, a request to communicatively couple to the first user device, establish a communication session with the second user device after receiving the request, identify, after establishing the communication session, an inappropriate activity of the second user device relating to the communication session, and perform a set of actions based on identifying the inappropriate activity. The set of actions may include causing the communication session to be restricted, and providing, to a trust platform, a score for the second user device. The score may permit the trust platform to derive a composite score, indicative of a level of trustworthiness of the second user device, that enables other user devices, associated with the trust platform, to determine whether to grant access requests submitted by the second user device.

BRIEF DESCRIPTION OF THE DRAWINGS

FIG. 4 is a flow chart of an example process for interacting with a trust platform to provide score information associated with a user device.

FIG. 5 is a flow chart of an example process for interacting with a trust platform to receive score information associated with a user device.

FIG. 6 is a flow chart of an example process for interacting with a trust platform to provide a score associated with a user device.

DETAILED DESCRIPTION

Figure 1A:
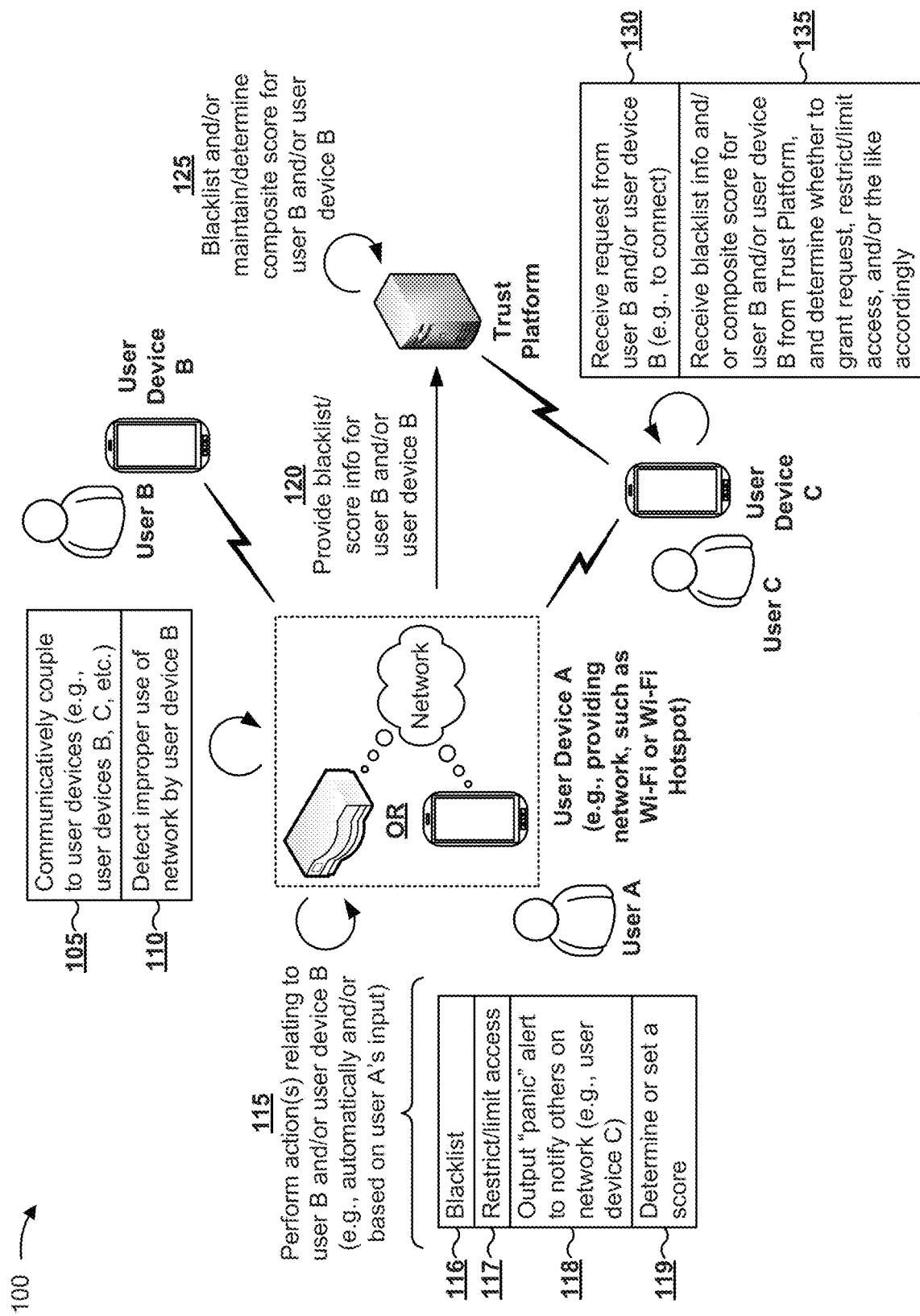
FIGS. 1A-1C are diagrams of example implementations described herein.

The following detailed description of example implementations refers to the accompanying drawings. The same reference numbers in different drawings may identify the same or similar elements.

Currently, a network provider, such as a user that provides a Wi-Fi hotspot network via a mobile device, or an establishment (e.g., a coffee shop and/or the like) that provides a public Wi-Fi network via a wireless router, has little or no information regarding the trustworthiness of a user device that is requesting access to the network. For example, the network provider may have no way of knowing if a user device, or a user associated with the user device, has a history of engaging in one or more inappropriate activities when connected to a network. As used herein, an inappropriate activity may include hacking, phishing, spamming, harassing of others on the network, streaming high definition content or downloading large files (and thus utilizing a large bandwidth of the network), accessing illegal or inappropriate content, and/or the like. Such activities, by a user device, may subject a network provider's network (and/or other users or user devices connected to the network) to security issues, or negatively impact network performance. Similarly, an institution, such as a bank, currently has little or no information regarding the trustworthiness of a network through which a user device (e.g., a user device that is submitting an application for credit or a request to approve a transaction) is connected to the institution. For example, if the user device is communicating with the institution via a public Wi-Fi network that engages in inappropriate activities, such as hacking, phishing, and/or the like, the institution may unknowingly approve a transaction or extend credit over an unsafe connection.

Some implementations, described herein, provide a trust platform that enables an entity (e.g., a user, an organization, an institution, and/or the like) to determine a level of trustworthiness of a user, a user device associated with the user, a network associated with the user and/or the user device, and/or the like, and perform suitable or appropriate action(s) based on the determination. For example, in some implementations, the trust platform is capable of permitting a first user device, or a user associated with the first user device, to provide a trustworthiness score for a second user device, or a user associated with the second user device, that is indicative of a level of trustworthiness of the second user device or the user associated with the second user device (e.g., based on the second user device's activities on a network provided by the first user device and/or the like). In some implementations, the trust platform is capable of permitting the first user device, or the user associated with the first user device, to blacklist the second user device or the user associated with the second user device (e.g., in a contact list stored in, or accessible to, the first user device), and/or to suggest that the second user device, or the user associated with the second user device, be blacklisted in or by the trust platform. In some implementations, the trust platform is capable of determining a composite score—e.g., a composite trustworthiness score—for a user, or a user device associated with the user, based on crowdsourced input or feedback, such as various trustworthiness scores and/or blacklisting suggestions, provided by multiple users or user devices. In some implementations, the trust platform is capable of permitting users to provide a trustworthiness score for a network, such as a Wi-Fi hotspot network, a public Wi-Fi network, and/or the like, that is indicative of a level of trustworthiness, a level of safety, and/or the like of the network, and which may be used (e.g., by an entity, such as a financial institution) to determine how, or whether, to process requests submitted by user devices that are communicatively coupled to the network.

In this way, an entity may determine, based on a level of trustworthiness associated with a user, or an associated user device, whether the user, or the associated user device, is to be granted certain access rights—e.g., for accessing a network (e.g., a public Wi-Fi network), for communicatively coupling with the entity's device (e.g., over Bluetooth and/or the like), and/or the like, which permits the entity to screen users or user devices before granting such access, thereby improving network security and/or device security. This also reduces or eliminates a need for the entity to employ third-party network, or device, monitoring applications, which conserves costs, computing resources, and memory resources. In addition, an entity, such as a financial institution may determine, based on trustworthiness-based information received from multiple sources (including, for example, scores that are indicative of a level of trustworthiness associated with a user, the user's user device, and/or a network connection relating to the user device), whether the user, or the user device, is to be permitted to conduct a transaction (e.g., to conduct a purchase over the Internet, up to a certain dollar amount, and/or the like) and/or whether the user is to be granted a certain amount of credit (e.g., in connection with a request to apply for a credit-based account), which permits the entity to avoid processing transactions or extending credit limits over an unsafe connection, thereby controlling credit risk and improving the overall security of transactions.

Figure 1B:
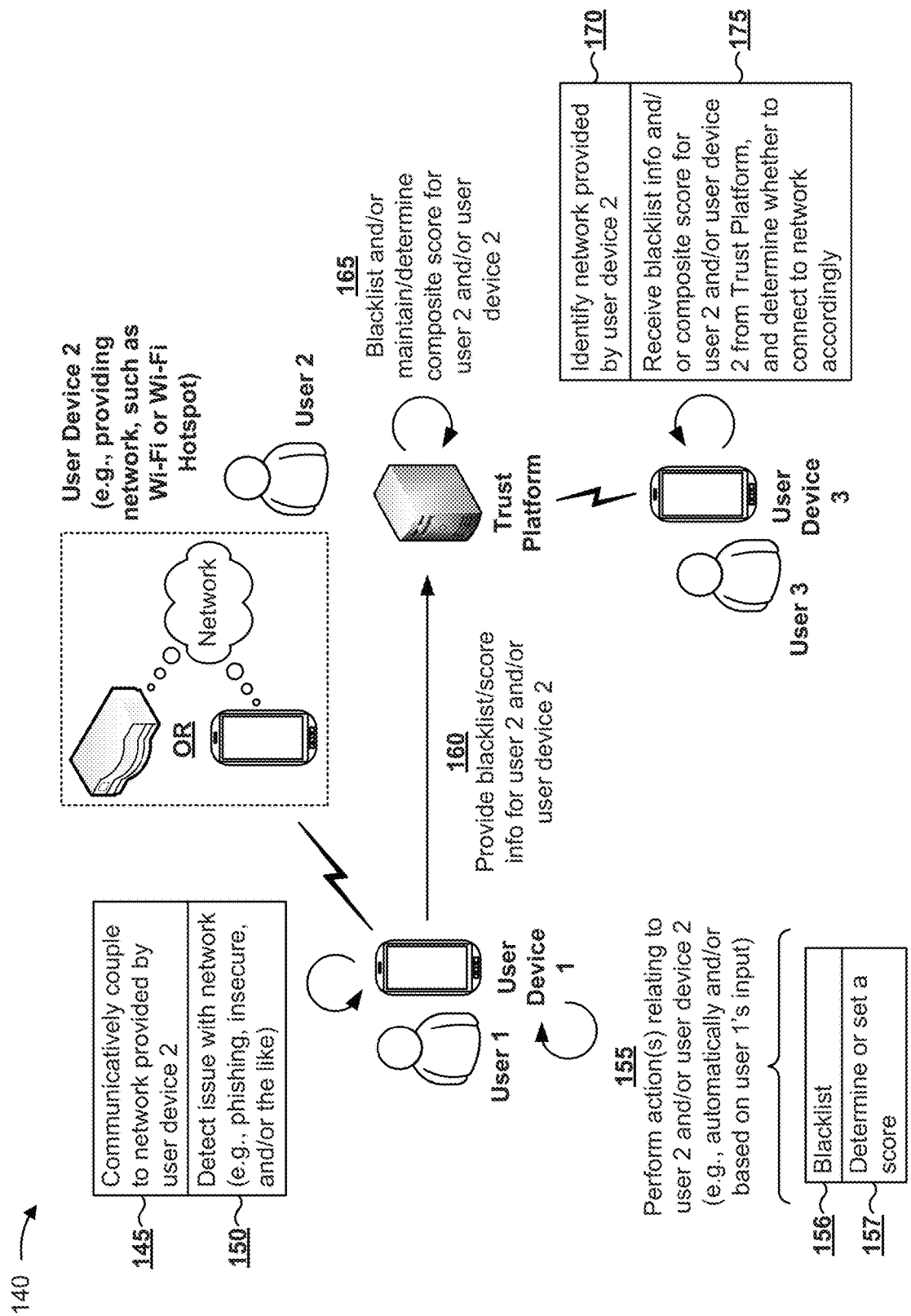
Figure 1C:
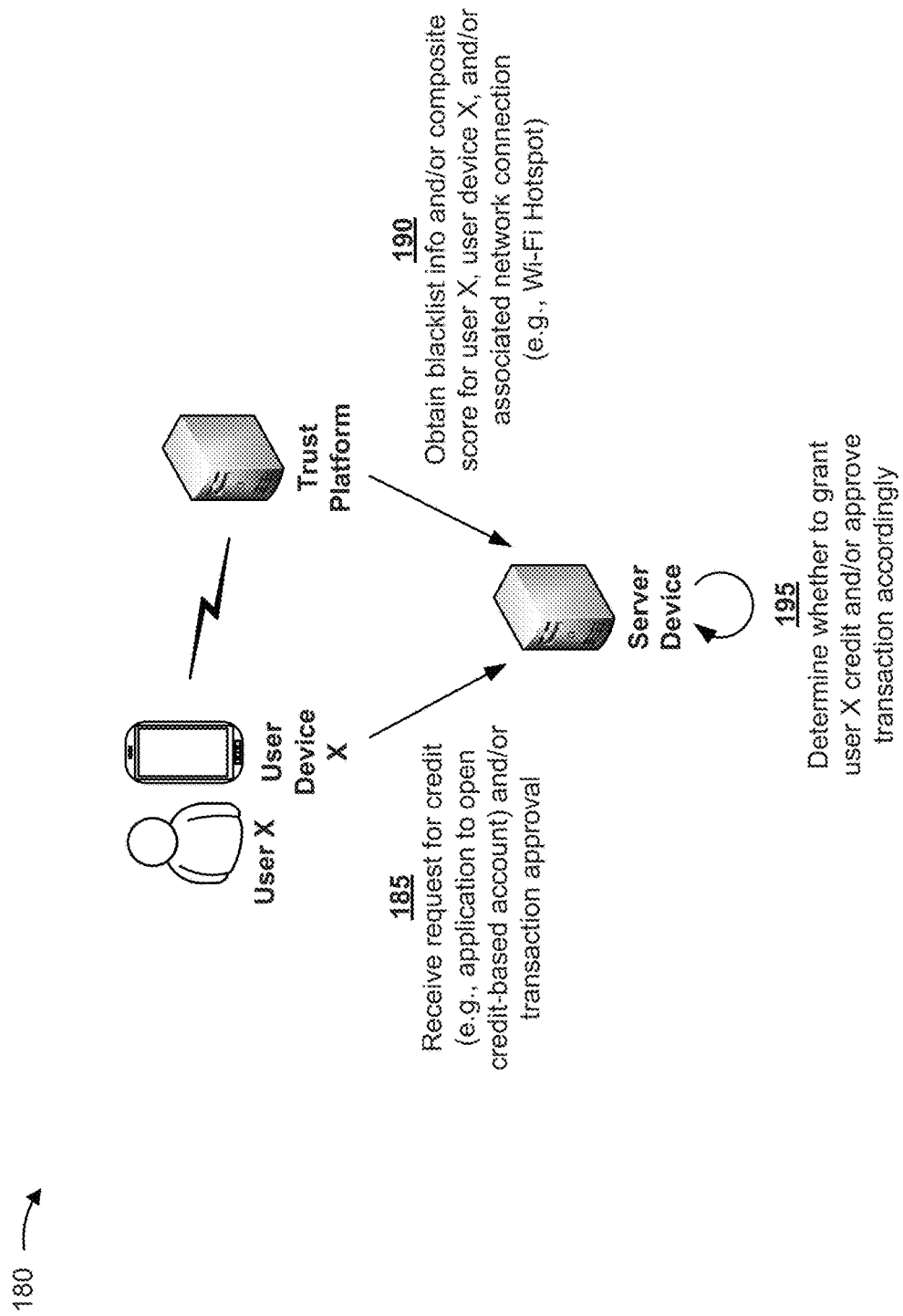

FIGS. 1A-1C are diagrams of example implementations 100, 140, and 180 described herein. As shown in FIG. 1A, example implementation 100 may include a trust platform, a user device A associated with a user A, a user device B associated with a user B, and a user device C associated with a user C. User device A may include a mobile device, a network device (e.g., a wireless router), and/or the like configured to provide a network. For example, user device A may be configured to provide a wireless local area network, such as a public Wi-Fi network, a Wi-Fi network at a hotspot, and/or the like. In some implementations, one of more of user device A, B, or C may include a trust application configured to communicate with the trust platform.

As shown in FIG. 1A, and as shown by reference number 105, user device A may communicatively couple to user devices, such as user device B and user device C. For example, user device A may provide a public Wi-Fi network (e.g., for accessing the Internet and/or the like), and may permit other user devices to access the public Wi-Fi network.

As shown by reference number 110, user device A may detect improper use of the network by user device B (e.g., inappropriate activities of user device B on the network). For example, the trust application, on user device A, may include, or have access to, one or more network usage applications configured to monitor the activity of each user device communicatively coupled to the network, and detect certain inappropriate usage of the network. Examples of inappropriate activities may include hacking, phishing, spamming, harassing of others on the network, streaming high definition content or downloading large files (and thus utilizing a large bandwidth of the network), accessing illegal or inappropriate content, and/or the like.

As shown by reference number 115, user device A may perform one or more actions relating to user B and/or user device B. In some implementations, user device A may perform the action(s) automatically. For example, user device A may, based on the monitored activity of user device B, automatically determine whether to take action against user device B. Additionally, or alternatively, and in some implementations, user device A may perform the action(s) based on an input from a user (e.g., user A). For example, user A may observe user B accessing illegal or inappropriate content using the network, identify the user device (e.g., user device B) that user B is using to access the illegal or inappropriate content (e.g., by reviewing network traffic logs for matching device identification information and accessed web content), and instruct user device A to perform the action(s) accordingly.

As shown by reference numbers 116 and 117, the action(s) may include blacklisting user B and/or user device B. For example, user device A may store information regarding user B (e.g., in a case where an identity of user B is known to user A or is otherwise made known to user device A) and/or user device B (e.g., device identification information) in a blacklist, such as by marking an entry, associated with user B and/or user device B, in a contact list indicating that user B and/or user device B is untrusted, is malicious, and/or the like. As another example, user device A may restrict user B and/or user device B from further accessing the network and/or from further accessing user device A (e.g., by terminating a communication session with user device B), may limit user B's and/or user device B's access to the network (e.g., by limiting an available bandwidth to user device B, such as capping an upload speed and/or download speed, capping total available network data usage, and/or the like), and/or the like.

As shown by reference number 118, user device A may output an alert to notify other users and/or other user devices on the network (e.g., user C and/or user device C) regarding user B and/or user device B (e.g., regarding the inappropriate activities of user B and/or user device B). In some implementations, user device A may output the alert based on an input from user A. For example, in some implementations, the trust application may include a user interface that provides a user-selectable "panic" button and/or the like that permits user A to issue an alert to other users and/or other user devices as needed. Additionally, or alternatively, and in some implementations, user device A may automatically issue an alert—e.g., based on a type of the inappropriate activity. For example, user device A may automatically issue an alert if user device B is engaging in hacking-related activities, but may not issue an alert if user device B is merely streaming high definition videos.

As shown by reference number 119, user device A may determine, or set, a trustworthiness score for user B and/or user device B. In some implementations, user device A may determine the trustworthiness score based on an input from user A. Additionally, or alternatively, and in some implementations, user device A may automatically determine the trustworthiness score—e.g., depending on a type of the inappropriate activity. For example, the trust application of user device A may automatically determine a particular trustworthiness score (e.g., a low trustworthiness score) if user device B is engaging in hacking-related activities, but may issue a higher trustworthiness score (e.g., higher than the particular trustworthiness score) if user device B is merely streaming high definition videos.

In some implementations, a user device (e.g., here, user device A) may use one or more machine learning algorithms configured to learn how to properly determine trustworthiness scores for other user devices. In some implementations, the user device may provide information regarding scoring criteria as input to one or more machine learning algorithms, which may perform machine learning to automate future determinations or predictions of trustworthiness scores. For example, the user device may train a machine learning algorithm based on known inputs (e.g., information regarding types of inappropriate activity, information regarding times during which inappropriate activities typically occur, information regarding typical durations of inappropriate activities, information regarding different types of user devices, and/or the like) and known outputs (e.g., actual trustworthiness scores based on the known inputs). In some implementations, the user device may refine a machine learning algorithm based on feedback received from a user of the user device and/or from one or more other devices (e.g., management device(s)). For example, the user of the user device and/or one or more management devices may provide information indicating whether predictions of trustworthiness scores, made by the machine learning algorithm, are accurate and/or appropriate. When the information indicates that a particular prediction is accurate and/or appropriate, the user device may configure the machine learning algorithm to make predictions of trustworthiness scores based on the particular prediction (e.g., to predict trustworthiness scores in a manner similar to that in which the particular prediction was made). When the information indicates that a particular prediction is not accurate or appropriate, the user device may configure the machine learning algorithm to avoid predicting trustworthiness scores in a manner in which the particular prediction was made. In this way, the user device can predict trustworthiness scores based on a machine learning algorithm, which improves the accuracy of the predictions, and conserves processor resources and/or storage resources that may otherwise be used to generate and store rules for predicting trustworthiness scores.

In some implementations, user device A may detect other conditions that warrant performing the action(s). For example, the trust application may be configured to determine, based on device identification information (e.g., media access control (MAC) address information, Bluetooth-related identification information, and/or the like associated with user device B), whether certain conditions are satisfied. As some examples, the trust application may be configured to determine whether user device B is listed as a lost or stolen device (e.g., in a public data structure and/or the like), whether user device B is associated with a known malicious actor (e.g., registered to a known hacker and/or the like), and/or the like, and perform the action(s) if the condition(s) are satisfied.

As shown by reference number 120, user device A may provide (e.g., via the trust application), to the trust platform, information identifying user B and/or user device B (e.g., device identification information and/or the like) and information regarding the trustworthiness score and/or information regarding blacklisting user B and/or user device B. As shown by reference number 125, the trust platform may blacklist user B and/or user device B and/or maintain and/or determine a composite score for user B and/or user device B based on some or all of the received information.

As one example, user device A may provide a suggestion to the trust platform to blacklist user B and/or user device B. In such a case, the trust platform may determine whether to blacklist user B and/or user device B—e.g., based on a quantity of similar suggestions, received from one or more other users and/or other user devices, satisfying a threshold. As another example, user device A may provide information regarding the trustworthiness score, in which case, the trust platform may determine a composite score based on the trustworthiness score, based on one or more other trustworthiness scores, associated with user B and/or user device B, that are provided by one or more other users and/or other user devices, and/or the like. The trust platform may determine the composite score in any suitable manner, such as by averaging all trustworthiness scores associated with user B and/or user device B, determining a median of such trustworthiness scores, and/or the like. In some implementations, the trust platform may assign a weighting to each trustworthiness score based on a source of the trustworthiness score. For example, the trust platform may assign a higher weighting to a trustworthiness score submitted by a user and/or an associated user device that is associated with a high trustworthiness score, to a score submitted by a trusted organization (e.g., a government entity, a professional organization, and/or the like), and/or the like, thereby improving the accuracy of the composite score as well as the overall operation of the trust platform. In some implementations, the trust platform may maintain one or more data structures (e.g., database(s), linked list(s), table(s), array(s), trie(s), and/or the like) that include information associating each user or user device with a corresponding composite score, and/or one or more data structures containing blacklist information.

In some implementations, the trust platform may use one or more machine learning algorithms configured to learn how to properly determine composite scores for users or associated user devices (e.g., similar to the machine learning algorithms described above—e.g., trained based on known inputs, known outputs, and/or feedback received from a user and/or a management device).

In some implementations, the trust application of a user device may provide a user interface that presents information regarding trustworthiness scores associated with other user devices connected to a network provided by the user device. In some implementations, the user interface may continually update what is displayed in real-time (or near real-time) based on any changes in the determined trustworthiness scores and/or composite scores received from the trust platform.

As shown by reference number 130, user device C may receive a request from user B and/or user device B (e.g., to access a network provided by user device C). As shown by reference number 135, user device C may receive (e.g., via the trust application), from the trust platform, composite score information and/or blacklist information associated with user B and/or user device B to determine whether to grant the request, restrict and/or limit access of user B and/or user device B, and/or the like. For example, user device C may submit, to the trust platform, a request (e.g., including device identification information associated with user device B) for such information. Continuing with the example, the trust platform may, based on the request, perform a lookup operation in the data structure to identify a composite score and/or blacklist information for user device B, and provide information regarding the composite score and/or the blacklist information to user device C. In some implementations, the trust platform may be configured to employ fuzzy matching and/or the like in cases where no direct matches are found when processing such a request.

In some implementations, user device C may perform the determination based on an input from user C. Additionally, or alternatively, and in some implementations, user device C may perform the determination automatically. For example, user device C may be configured to automatically reject the request if user B and/or user device B is included in a blacklist, if a composite score associated with user B and/or user device B satisfies a threshold (e.g., is less than a particular value), and/or the like.

In some implementations, a user device may use one or more machine learning algorithms configured to learn how to properly determine whether to grant another user device access rights and/or to restrict and/or limit access by the other user device (e.g., similar to the machine learning algorithms described above—e.g., trained based on known inputs, known outputs, and/or feedback received from a user and/or a management device).

In this way, an entity may determine, based on a level of trustworthiness associated with a user, or an associated user device, whether the user, or the associated user device, is to be granted certain access rights—e.g., for accessing a network (e.g., a public Wi-Fi network), for communicatively coupling with the entity's device (e.g., over Bluetooth and/or the like), and/or the like, which permits the entity to screen users or user devices before granting such access, thereby improving network security and/or device security.

In some implementations, a network provided by a user and/or a user device may be blacklisted and/or associated with a trustworthiness score. FIG. 1B is a diagram of an example implementation 140 that includes a trust platform (e.g., similar to the trust platform described above in connection with example implementation 100), a user device 1 associated with a user 1, a user device 2 associated with a user 2, and a user device 3 associated with a user 3. Similar to example implementation 100, one or more of user device 1, 2, or 3 may each include a trust application configured to communicate with the trust platform.

As shown by reference number 145, user device 1 may communicatively couple to, or access, a network (e.g., a public Wi-Fi network and/or the like) provided by user device 2. As shown by reference number 150, user device 1 (e.g., a trust application installed on user device 1) may detect an issue with the network. For example, the trust application may detect the occurrence of an inappropriate activity of user device 2 on the network, such as a hacking-related activity, a phishing-related activity, and/or the like. As another example, the trust application may detect a lack of security, or defective security, on the network.

As shown by reference number 155, user device 1 may perform one or more actions relating to user 2 and/or user device 2 (e.g., automatically and/or based on user 1's input), such as blacklisting (reference number 156) user 2, user device 2, and/or the network (e.g., based on network identification information, such as a service set identifier (SSID) associated with the network), and determining, or setting, a trustworthiness score (reference number 157) for user 2, user device 2, and/or the network, and/or the like—e.g., similar to that described above in connection with example implementation 100.

As shown by reference number 160, user device 1 may provide (e.g., via the trust application), to the trust platform, information regarding user 2 and/or user device 2 (e.g., device identification information, network identification information, and/or the like), and information regarding blacklisting user 2 and/or user device 2 and/or information regarding the trustworthiness score. As shown by reference number 165, the trust platform may blacklist user 2, user device 2, and/or the network, and/or determine a composite score for user 2, user device 2, and/or the network (e.g., in a manner similar to that described above in connection with example implementation 100).

As shown by reference number 170, user device 3 may identify a network provided by user device 2. For example, user device 3 may be located near a Wi-Fi hotspot provided by user device 2, and user device 3 may detect a presence of the Wi-Fi hotspot. As shown by reference number 175, user device 3 may receive (e.g., via a trust application installed on user device 3), from the trust platform, blacklist information and/or composite score information associated with user 2, user device 2, and/or the network to determine whether to access the network. For example, the trust application may submit, to the trust platform, a request for such information (e.g., a request that includes network identification information, such as an SSID of the network provided by user device 2 and/or the like), and the trust platform may perform a lookup operation based on the request (e.g., similar to that described above in connection with example implementation 100) to identify the requested information.

In some implementations, user device 3 may perform the determination based on an input from user 3 (e.g., based on a decision made by user 3 as to whether the network is safe to connect to). Additionally, or alternatively, and in some implementations, user device 3 may perform the determination automatically. For example, user device 3 may be configured to prevent user device 3 from communicatively coupling to the network if user 2, user device 2, and/or the network is included in a blacklist, if a composite score associated with user 2, user device 2, and/or the network satisfies a threshold (e.g., is less than a particular value), and/or the like.

In this way, a first user or a first user device may determine, based on a level of trustworthiness associated with a second user, a second user device, and/or an associated network, whether to communicatively couple to the associated network.

In some implementations, an entity (e.g., a financial institution and/or the like) may determine whether to extend credit to a user, and/or to approve a transaction entered into by the user, based on whether the user, the user's user device, and/or a network through which the user device is connected is blacklisted and/or based on a composite score associated with the user, the user device, and/or the network. FIG. 1C is a diagram of an example implementation 180 that includes a trust platform, a user device X, and a server device. The server device may be associated with an entity, such as a financial institution (e.g., a bank) and/or the like.

As shown by reference number 185, the server device may receive, from user device X, a request for credit. For example, the server device may receive an application form from user X to open a credit-based account (e.g., a credit card account and/or the like). As another example, the server device may receive a request from user X to approve a transaction (e.g., a financial transaction and/or the like). In some implementations, user device X may (e.g., via a trust application similar to that described above in connection with example implementations 100 and 140) provide, to the server device, device identification information and/or the like.

As shown by reference number 190, the server device may obtain (e.g., via a trust application similar to that described above in connection with example implementations 100 and 140), from the trust platform, blacklist information and/or composite score information associated with user X, user device X, and/or a network associated with user device X (e.g., a Wi-Fi hotspot network to which user device X is connected). For example, the server device may submit, to the trust platform, a request based on such information, and the trust platform may perform a lookup operation based on the request (e.g., similar to that described above in connection with example implementation 100) to identify the requested information. As shown by reference number 195, the server device may determine whether to extend credit to user X (e.g., whether to open up the credit-based account for user X), determine how much credit, if any, is to be extended to user X, determine whether to approve the transaction, and/or the like, based on the information received from the trust platform (e.g., based on how trustworthy user X is, how trustworthy user device X is, and/or how trustworthy the associated network is).

In some implementations, the server device may obtain information regarding a location of user device X (e.g., provided by a trust application installed on user device X and/or provided by the trust platform), and utilize this information, in conjunction with the blacklist information, the composite score(s), and/or the like, as part of one or more of the determinations. In some implementations, the trust application, on a user device (e.g., user device X), may determine a current location of the user device based on sensor data provided by one or more sensors (e.g., a global positioning system (GPS) receiver and/or the like) included in the user device, based on location information provided by a third-party application on the user device (e.g., a social media-based application, a map-based application, and/or any other application that has location tracking features), and/or the like. In a case where user device X is located at or near user X's known home or work location, the server device may be more likely to grant user X a credit-based account, extend a higher amount of credit to user X, and/or approve a transaction (e.g., up to a certain amount) than if user device X is located away from user X's known home or work location. In some implementations, the server device may associate a weighting to location-based information to configure how much the location of a user or associated user device factors into the one or more determinations.

In some implementations, a trust platform may receive information regarding a network, to which a user device is connected, as well all other user devices that are communicatively coupled to the network (e.g., "network map"), determine a composite score that is based on a score of the user device, a score associated with the network, and/or one or more scores associated with the other user devices, and determine whether to extend credit or to approve a transaction based on such a composite score (and/or provide the composite score to a server device, such as the server device shown in example implementation 180, to enable the server device to perform such determinations).

In some implementations, one or more functions of the trust platform, described above, may be included in a server device (e.g., in the server device shown in example implementation 180). In such cases, the server device may perform the various operations described above, such as determining composite scores, interacting with trust applications on user devices, and/or the like.

In this way, an entity may leverage implementations of the trust platform described herein to determine a "fingerprint" for a user or an associated user device (e.g., based on blacklist information, current composite score information, current device location information, device identification information, current network connection information, and/or the like) to assess, in real-time (or near real-time), whether it is risky to extend credit and/or approve a transaction.

In some implementations, the trust application, of a first user device, may be configured to permit sharing of trustworthiness information, such as a trustworthiness score associated with a particular user device and/or blacklist information associated with the particular user device, with one or more other user devices. Shared data may include device identification information (e.g., a MAC address, a Bluetooth-based ID, an IP address, and/or the like) associated with the particular user device, data regarding a network (e.g., an SSID and/or the like) associated with the particular user device, and/or the like. In some implementations, the trust application may be configured to automatically share such data with a second user device when the second user device is located within a threshold distance from the first user device, based on an input provided by a user of the first user device, and/or the like. In some implementations, the trust application may permit a user to set or configure settings relating to sharing such data, such as criteria that must be satisfied in order for sharing to occur (e.g., criteria, such as permitting sharing only if a second user device is known to the first user device (e.g., if information regarding the second user device, or a user associated with the second user device, is stored in a contact list in the first user device) and/or the like).

In this way, an entity may determine, based on a level of trustworthiness associated with a user, or an associated user device, whether the user, or the associated user device, is to be granted certain access rights—e.g., for accessing a network (e.g., a public Wi-Fi network), for communicatively coupling with the entity's device (e.g., over Bluetooth and/or the like), and/or the like, which permits the entity to screen users or user devices before granting such access, thereby improving network security and/or device security. This also reduces or eliminates a need for the entity to employ third-party network, or device, monitoring applications, which conserves costs, computing resources, and memory resources. In addition, an entity, such as a financial institution, may determine, based on trustworthiness-based information received from multiple sources (including, for example, scores that are indicative of a level of trustworthiness associated with a user, the user's user device, and/or a network connection relating to the user device), whether the user, or the user device, is to be permitted to conduct a transaction (e.g., to conduct a purchase over the Internet, up to a certain dollar amount, and/or the like) and/or whether the user is to be granted a certain amount of credit (e.g., in connection with a request to apply for a credit-based account), which permits the entity to avoid processing transactions or extending credit limits over an unsafe connection, thereby controlling credit risk and improving the overall security of transactions.

As indicated above, FIGS. 1A-1C are provided merely as examples. Other examples are possible and may differ from what was described with regard to FIGS. 1A-1C.

Figure 2:
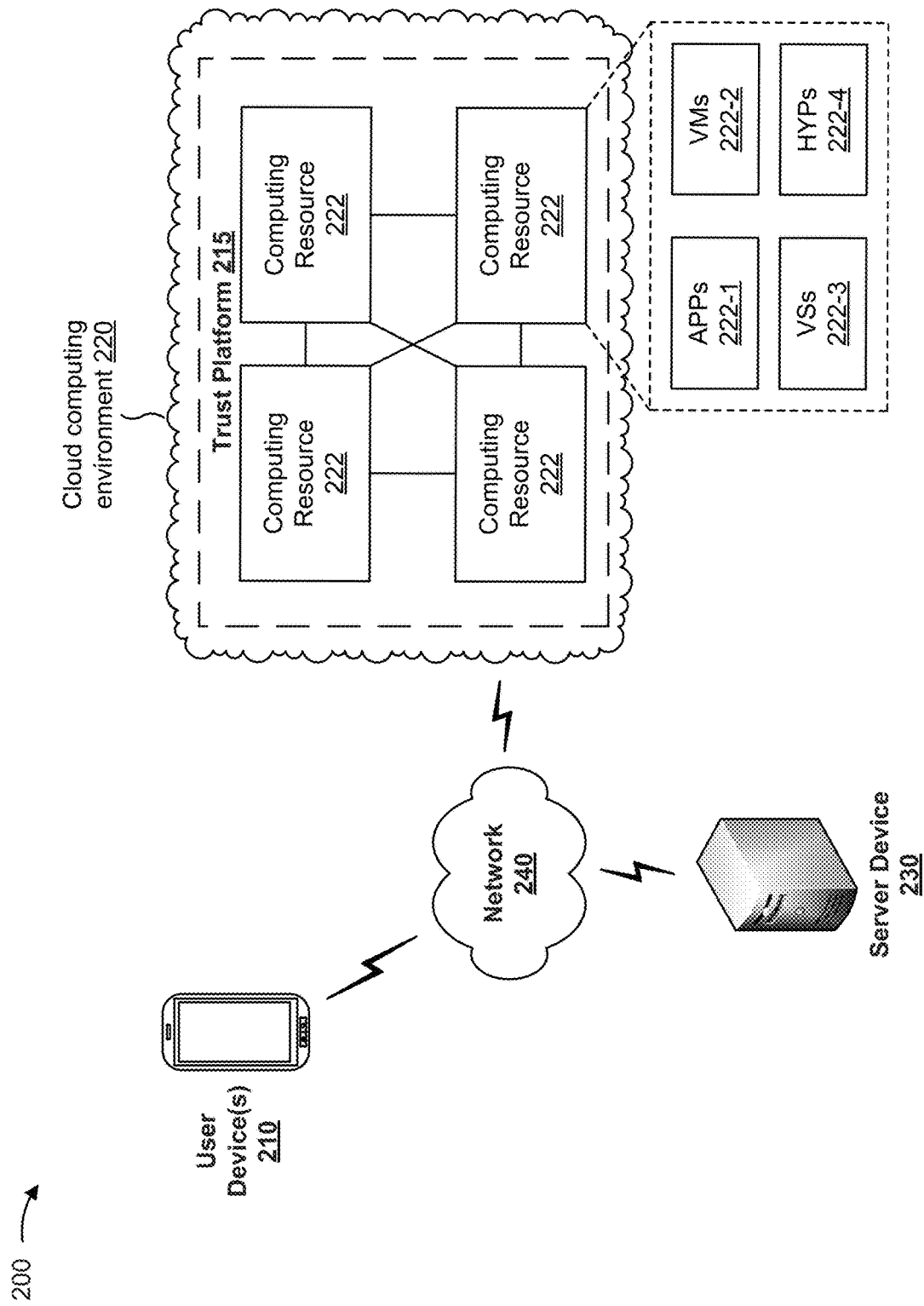
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user device(s) 210, a trust platform 215, a server device 230, and a network 240. Devices of environment 200 may interconnect via wired connections, wireless connections, or a combination of wired and wireless connections.

User device 210 includes one or more devices capable of receiving, generating, storing, processing, and/or providing information associated with a user. For example, user device 210 may include a communication and/or computing device, such as a mobile phone (e.g., a smart phone, a radiotelephone, etc.), a desktop computer, a laptop computer, a tablet computer, a handheld computer, a gaming device, a device integrated within a vehicle, a wearable communication device (e.g., a smart wristwatch, a pair of smart eyeglasses, etc.), or a similar type of device.

Trust platform 215 includes one or more devices capable of receiving, generating, storing, processing, and/or providing information associated with enabling an entity to determine a level of trustworthiness of a user, a user device, and/or a network, and perform action(s) based on the determination, as described elsewhere herein. Trust platform 215 may include a server device or a group of server devices. In some implementations, as shown, trust platform 215 can be hosted in cloud computing environment 220. Notably, while implementations described herein describe trust platform 215 as being hosted in cloud computing environment 220, in some implementations, trust platform 215 is not cloud-based or can be partially cloud-based.

Cloud computing environment 220 includes an environment that delivers computing as a service, whereby shared resources, services, etc. can be provided to user device 210 and/or one or more other trust platforms 215. Cloud computing environment 220 can provide computation, software, data access, storage, and/or other services that do not require end-user knowledge of a physical location and configuration of a system and/or a device that delivers the services. As shown, cloud computing environment 220 can include a set of computing resources 222.

Computing resource 222 includes one or more personal computers, workstation computers, server devices, or another type of computation and/or communication device. In some implementations, computing resource 222 can host trust platform 215. The cloud resources can include compute instances executing in computing resource 222, storage devices provided in computing resource 222, data transfer devices provided by computing resource 222, etc. In some implementations, computing resource 222 can communicate with other computing resources 222 via wired connections, wireless connections, or a combination of wired and wireless connections.

As further shown in FIG. 2, computing resource 222 can include a group of cloud resources, such as one or more applications ("APPs") 222-1, one or more virtual machines ("VMs") 222-2, virtualized storage ("VSs") 222-3, one or more hypervisors ("HYPs") 222-4, and/or the like.

Application 222-1 includes one or more software applications that can be provided to or accessed by user device 210. Application 222-1 can eliminate a need to install and execute the software applications on user device 210. For example, application 222-1 can include software associated with trust platform 215 and/or any other software capable of being provided via cloud computing environment 220. In some implementations, one application 222-1 can send/receive information to/from one or more other applications 222-1, via virtual machine 222-2.

Virtual machine 222-2 includes a software implementation of a machine (e.g., a computer) that executes programs like a physical machine. Virtual machine 222-2 can be either a system virtual machine or a process virtual machine, depending upon use and degree of correspondence to any real machine by virtual machine 222-2. A system virtual machine can provide a complete system platform that supports execution of a complete operating system (OS). A process virtual machine can execute a single program, and can support a single process. In some implementations, virtual machine 222-2 can execute on behalf of a user (e.g., user device 210) and/or on behalf of one or more other trust platforms 215, and can manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 can present a virtual operating platform to the guest operating systems, and can manage the execution of the guest operating systems. Multiple instances of a variety of operating systems can share virtualized hardware resources.

Server device 230 includes one or more devices capable of receiving, storing, providing, generating, and/or processing information associated with an entity, such as a financial institution (e.g., a bank). For example, server device 230 can include a server device or a group of server devices (e.g., associated with a multi-server micro data center), a workstation computer or a group of workstation computers, a virtual machine (VM) or a group of virtual machines (VMs) implemented by one or more computing devices provided in a cloud computing environment, or a similar type or group of devices. In some implementations, server device 230 may determine whether to extend credit to a user, or approve a transaction, based on information received from a trust platform (e.g., trust platform 215), as described elsewhere herein.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
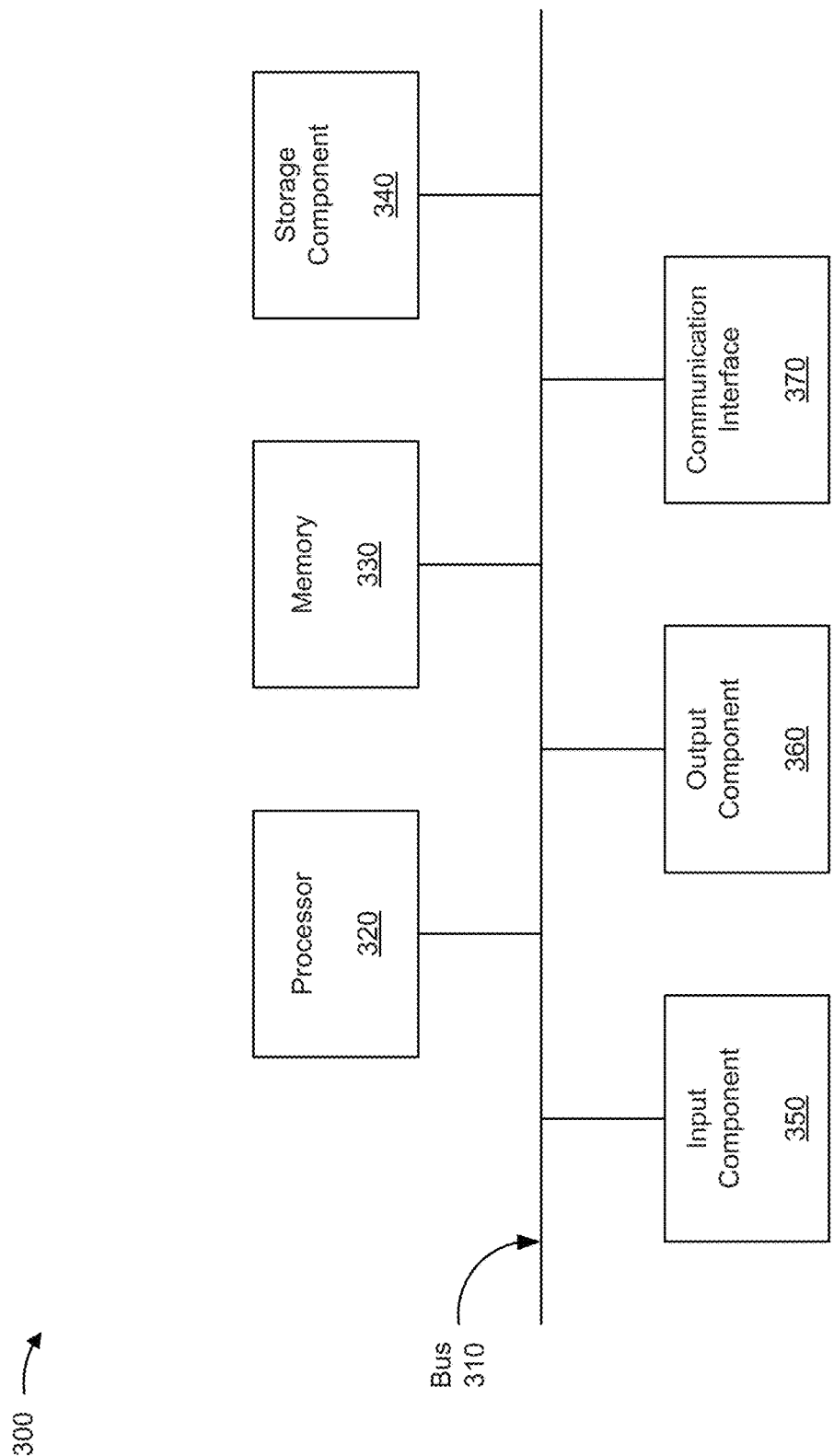
FIG. 3 is a diagram of example components of one or more devices of FIG. 2.

FIG. 3 is a diagram of example components of a device 300. Device 300 may correspond to user device 210, trust platform 215, and/or server device 230. In some implementations, user device 210, trust platform 215, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for interacting with a trust platform to provide score information associated with a user device. In some implementations, one or more process blocks of FIG. 4 may be performed by a first device (e.g., a first user device 210). In some implementations, one or more process blocks of FIG. 4 may be performed by another device or a group of devices separate from or including the first device, such as a trust platform (e.g., trust platform 215), a server device (e.g., server device 230), and/or the like.

As shown in FIG. 4, process 400 may include receiving, by a first device and from a second device, a request to access a network provided by the first device (block 410). For example, the first device (e.g., using processor 320, memory 330, storage component 340, input component 350, communication interface 370, and/or the like) may receive, from a second device (e.g., a second user device 210), a request to access a network provided by the first device, as described above in connection with FIGS. 1A-1C.

As further shown in FIG. 4, process 400 may include establishing, by the first device, a communication session with the second device after receiving the request, the communication session enabling the second device to access the network (block 420). For example, the first device (e.g., using processor 320, memory 330, storage component 340, communication interface 370, and/or the like) may establish a communication session with the second device after receiving the request, as described above in connection with FIGS. 1A-1C. In some implementations, the communication session may enable the second device to access the network.

As further shown in FIG. 4, process 400 may include identifying, by the first device and after establishing the communication session, an inappropriate activity associated with the second device on the network (block 430). For example, the first device (e.g., using processor 320, memory 330, storage component 340, input component 350, communication interface 370, and/or the like) may identify, after establishing the communication session, an inappropriate activity associated with the second device on the network, as described above in connection with FIGS. 1A-1C.

As further shown in FIG. 4, process 400 may include performing a plurality of actions based on identifying the inappropriate activity, the plurality of actions including terminating the communication session, outputting a notification to one or more other devices, communicatively coupled to the network, to alert one or more users, of the one or more other devices, to the inappropriate activity, and providing, to a trust platform, a score for the second device, the score permitting the trust platform to derive a composite score, indicative of an overall level of trustworthiness of the second device, that enables users of the trust platform to perform appropriate actions associated with the second device (block 440). For example, the first device (e.g., using processor 320, memory 330, storage component 340, output component 360, communication interface 370, and/or the like) may perform a plurality of actions based on identifying the inappropriate activity. In some implementations, the plurality of actions may include terminating the communication session, outputting a notification to one or more other devices, communicatively coupled to the network, to alert one or more users, of the one or more other devices, to the inappropriate activity, and providing, to a trust platform, a score for the second device. In some implementations, the score may permit the trust platform to derive a composite score, indicative of an overall level of trustworthiness of the second device, that enables users of the trust platform to perform appropriate actions associated with the second device.

Process 400 may include additional implementations, such as any single implementation or any combination of implementations described below and/or in connection with one or more other processes described elsewhere herein.

In some implementations, the score may permit the trust platform to derive a composite score that enables a financial institution to determine whether to process a transaction associated with the second device. In some implementations, the score may permit the trust platform to derive a composite score that enables a financial institution to determine whether to extend credit, in connection with an application submitted by the second device for a credit-based account, to a user associated with the second device.

In some implementations, the notification may include device identification information associated with the second device, and/or information regarding a location of the second device. In some implementations, the network may include a wireless local area network at a hotspot. In some implementations, the first device may cause the second device to be blacklisted on the first device to prevent the second device from further accessing the network, and/or provide, to the trust platform, a suggestion to blacklist the second device on the trust platform.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for interacting with a trust platform to receive score information associated with a user device. In some implementations, one or more process blocks of FIG. 5 may be performed by a server device (e.g., server device 230). In some implementations, one or more process blocks of FIG. 5 may be performed by another device or a group of devices separate from or including the server device, such as a user device (e.g., user device 210), a trust platform (e.g., trust platform 215), and/or the like. In some implementations, a device (e.g., the server device) may include one or more memories, and one or more processors, communicatively coupled to the one or more memories, configured to perform process 500.

As shown in FIG. 5, process 500 may include receiving, from a user device, an application to extend credit to a user of the user device, or a request to approve a transaction (block 510). For example, the server device (e.g., using processor 320, memory 330, storage component 340, input component 350, communication interface 370, and/or the like) may receive, from a user device (e.g., user device 210), an application to extend credit to a user of the user device, or a request to approve a transaction, as described above in connection with FIGS. 1A-1C.

As further shown in FIG. 5, process 500 may include obtaining, from the user device and after receiving the application or the request, device identification information associated with the user device, and data regarding a network to which the user device is communicatively coupled (block 520). For example, the server device (e.g., using processor 320, memory 330, storage component 340, input component 350, communication interface 370, and/or the like) may obtain, from the user device and after receiving the application or the request, device identification information associated with the user device, and data regarding a network to which the user device is communicatively coupled, as described above in connection with FIGS. 1A-1C.

As further shown in FIG. 5, process 500 may include receiving, from a trust platform, a first score associated with the user device, and a second score associated with the network, after obtaining the device identification information and the data regarding the network (block 530). For example, the server device (e.g., using processor 320, memory 330, storage component 340, input component 350, communication interface 370, and/or the like) may receive, from a trust platform (e.g., trust platform 215), a first score associated with the user device, and a second score associated with the network, after obtaining the device identification information and the data regarding the network, as described above in connection with FIGS. 1A-1C.

As further shown in FIG. 5, process 500 may include determining whether credit is to be extended to the user, or whether the transaction is to be approved, based on the first score and the second score (block 540). For example, the server device (e.g., using processor 320, memory 330, storage component 340, and/or the like) may determine whether credit is to be extended to the user, or whether the transaction is to be approved, based on the first score and the second score, as described above in connection with FIGS. 1A-1C.

As further shown in FIG. 5, process 500 may include performing an action based on determining whether credit is to be extended to the user or based on determining whether the transaction is to be approved (block 550). For example, the server device (e.g., using processor 320, memory 330, storage component 340, communication interface 370, and/or the like) may perform an action based on determining whether credit is to be extended to the user or based on determining whether the transaction is to be approved, as described above in connection with FIGS. 1A-1C.

Process 500 may include additional implementations, such as any single implementation or any combination of implementations described below and/or in connection with one or more other processes described elsewhere herein.

In some implementations, the server device may obtain information regarding a location of the user device. In some implementations, the server device may determine whether credit is to be extended to the user, or whether the transaction is to be approved, based on the information regarding the location of the user device.

In some implementations, the first score may be based on one or more scores, provided to the trust platform from one or more other user devices, relating to activities of the user device. In some implementations, the second score may be based on one or more scores, provided to the trust platform from one or more other user devices, relating to a level of trustworthiness of the network.

In some implementations, the server device may cause credit, up to a particular credit limit, to be extended to the user based on determining that credit is to be extended to the user. In some implementations, the server device may not extend credit to the user based on determining that credit is to not be extended to the user. In some implementations, the server device may approve the transaction based on determining that the transaction is to be approved.

In some implementations, the server device may determine a transaction limit for the user based on the first score and/or the second score. In some implementations, the server device may approve or reject the transaction based on the transaction limit. In some implementations, the server device may provide, to the user device, a notification regarding the transaction limit after determining the transaction limit. In some implementations, the data regarding the network may include a service set identifier (SSID) associated with the network or an Internet Protocol (IP) address associated with a device that provides the network.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for interacting with a trust platform to receive score information associated with a user device. In some implementations, one or more process blocks of FIG. 6 may be performed by a first user device (e.g., a first user device 210). In some implementations, one or more process blocks of FIG. 6 may be performed by another device or a group of devices separate from or including the first user device, such as a trust platform (e.g., trust platform 215), a server device (e.g., server device 230), and/or the like. In some implementations, a non-transitory computer-readable medium may store instructions that include one or more instructions that, when executed by one or more processors of the first user device, cause the one or more processors to perform process 600.

As shown in FIG. 6, process 600 may include receiving, from a second user device (e.g., a second user device 210), a request to communicatively couple to a first user device (block 610). For example, the first user device (e.g., using processor 320, memory 330, storage component 340, input component 350, communication interface 370, and/or the like) may receive, from the second user device, a request to communicatively couple to the first user device, as described above in connection with FIGS. 1A-1C.

As further shown in FIG. 6, process 600 may include establishing a communication session with the second user device after receiving the request (block 620). For example, the first user device (e.g., using processor 320, memory 330, storage component 340, communication interface 370, and/or the like) may establish a communication session with the second user device after receiving the request, as described above in connection with FIGS. 1A-1C.

As further shown in FIG. 6, process 600 may include identifying, after establishing the communication session, an inappropriate activity of the second user device relating to the communication session (block 630). For example, the first user device (e.g., using processor 320, memory 330, storage component 340, input component 350, communication interface 370, and/or the like) may identify, after establishing the communication session, an inappropriate activity of the second user device relating to the communication session, as described above in connection with FIGS. 1A-1C.

As further shown in FIG. 6, process 600 may include performing a set of actions based on identifying the inappropriate activity, the set of actions including causing the communication session to be restricted, and providing, to a trust platform, a score for the second user device, the score permitting the trust platform to derive a composite score, indicative of a level of trustworthiness of the second user device, that enables other user devices, associated with the trust platform, to determine whether to grant access requests submitted by the second user device (block 640). For example, the first user device (e.g., using processor 320, memory 330, storage component 340, output component 360, communication interface 370, and/or the like) may perform a set of actions based on identifying the inappropriate activity, the set of actions, as described above in connection with FIGS. 1A-1C. In some implementations, the set of actions may include causing the communication session to be restricted, and providing, to a trust platform, a score for the second user device. In some implementations, the score may permit the trust platform to derive a composite score, indicative of a level of trustworthiness of the second user device, that enables other user devices, associated with the trust platform, to determine whether to grant access requests submitted by the second user device.

Process 600 may include additional implementations, such as any single implementation or any combination of implementations described below and/or in connection with one or more other processes described elsewhere herein.

In some implementations, the first user device may monitor an activity of the second user device relating to the communication session. In some implementations, the first user device may identify the inappropriate activity based on monitoring the activity of the second user device and/or based on an input provided by a user of the first user device. In some implementations, the score may be generated based on one or more inputs provided by a user of the first user device. In some implementations, the score may be generated based on a type of the inappropriate activity.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, an entity may determine, based on a level of trustworthiness associated with a user, or an associated user device, whether the user, or the associated user device, is to be granted certain access rights—e.g., for accessing a network (e.g., a public Wi-Fi network), for communicatively coupling with the entity's device (e.g., over Bluetooth and/or the like), and/or the like, which permits the entity to screen users or user devices before granting such access, thereby improving network security and/or device security. This also reduces or eliminates a need for the entity to employ third-party network, or device, monitoring applications, which conserves costs, computing resources, and memory resources. In addition, an entity, such as a financial institution may determine, based on trustworthiness-based information received from multiple sources (including, for example, scores that are indicative of a level of trustworthiness associated with a user, the user's user device, and/or a network connection relating to the user device), whether the user, or the user device, is to be permitted to conduct a transaction (e.g., to conduct a purchase over the Internet, up to a certain dollar amount, and/or the like) and/or whether the user is to be granted a certain amount of credit (e.g., in connection with a request to apply for a credit-based account), which permits the entity to avoid processing transactions or extending credit limits over an unsafe connection, thereby controlling credit risk and improving the overall security of transactions.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:
   receiving, by a first device and from a second device, a request to access a network provided by the first device;
   establishing, by the first device, a communication session with the second device after receiving the request,
      the communication session enabling the second device to access the network;
   identifying, by the first device and after establishing the communication session, an inappropriate activity associated with the second device on the network,
      the inappropriate activity being identified based on monitoring, by the first device, network activity of the second device;
   performing, by the first device, a plurality of actions based on identifying the inappropriate activity,
      the plurality of actions including:
         terminating the communication session;
         outputting a notification to one or more other devices, communicatively coupled to the network via the first device, to alert one or more users, of the one or more other devices, to the inappropriate activity,
            the notification including device identification information associated with the second device; and
         providing, to a trust platform, a score for the second device,
            the score permitting the trust platform to derive a composite score, indicative of an overall level of trustworthiness of the second device, that enables users of the trust platform to perform appropriate actions associated with the second device.

2. The method of claim 1, wherein the composite score enables a financial institution to determine whether to process a transaction associated with the second device.

3. The method of claim 1, wherein the composite score enables a financial institution to determine whether to extend credit, in connection with an application submitted by the second device for a credit-based account, to a user associated with the second device.

4. The method of claim 1, wherein the notification includes:
   information regarding a location of the second device.

5. The method of claim 1, wherein the network includes a wireless local area network at a hotspot.

6. The method of claim 1, wherein the plurality of actions further includes:

causing the second device to be blacklisted on the first device to prevent the second device from further accessing the network; or providing, to the trust platform, a suggestion to blacklist the second device on the trust platform.

7. A non-transitory computer-readable medium storing instructions, the instructions comprising:
one or more instructions that, when executed by one or more processors of a first user device, cause the one or more processors to:
receive, from a second user device, a request to communicatively couple to the first user device;
establish a communication session with the second user device after receiving the request,
the communication session enabling the second user device to access a network provided by the first user device;
monitor an activity of the second user device relating to the communication session;
identify, after establishing the communication session and based on the monitoring, an inappropriate activity of the second user device relating to the communication session; and
perform a set of actions based on identifying the inappropriate activity, the set of actions including:
causing the communication session to be restricted, and
outputting a notification to one or more other devices, communicatively coupled to the network via the first user device, to alert one or more users, of the one or more other devices, to the inappropriate activity,
the notification including device identification information associated with the second user device; and
provide, to a trust platform, a score for the second user device,
the score permitting the trust platform to derive a composite score, indicative of a level of trustworthiness of the second user device, that enables other user devices, associated with the trust platform, to determine whether to grant access requests submitted by the second user device.

8. The non-transitory computer-readable medium of claim 7, wherein the one or more instructions, that cause the one or more processors to identify the inappropriate activity, further cause the one or more processors to:
identify the inappropriate activity further based on an input provided by a user of the first user device.

9. The non-transitory computer-readable medium of claim 7, wherein the score is generated based on one or more inputs provided by the user of the first user device.

10. The non-transitory computer-readable medium of claim 7, wherein the score is generated based on a type of the inappropriate activity.

11. A first user device, comprising:
one or more memories; and
one or more processors, communicatively coupled to the one or more memories, configured to:
receive, from a second user device, a request to communicatively couple to the first user device;
establish a communication session with the second user device after receiving the request,
the communication session enabling the second user device to access a network provided by the first user device;
monitor an activity of the second user device relating to the communication session;
identify, after establishing the communication session and based on the monitoring, an inappropriate activity of the second user device relating to the communication session; and
perform a set of actions based on identifying the inappropriate activity, the set of actions including:
causing the communication session to be restricted,
outputting a notification to one or more other devices, communicatively coupled to the network via the first user device, to alert one or more users, of the one or more other devices, to the inappropriate activity,
the notification including device identification information associated with the second user device, and
providing, to a trust platform, a score for the second user device,
the score permitting the trust platform to derive a composite score, indicative of a level of trustworthiness of the second user device, that enables other user devices, associated with the trust platform, to determine whether to grant access requests submitted by the second user device.

12. The first user device of claim 11, wherein the one or more processors
when identifying the inappropriate activity, are further to:
identify the inappropriate activity further based on an input provided by a user of the first user device.

13. The first user device of claim 11, wherein the score is generated based on one or more inputs provided by a user of the first user device.

14. The first user device of claim 11, wherein the score is generated based on a type of the inappropriate activity.

15. The first user device of claim 11, wherein the composite score enables a financial institution to determine whether to process a transaction associated with the second user device.

16. The first user device of claim 11, wherein the composite score enables a financial institution to determine whether to extend credit, in connection with an application submitted by the second user device for a credit-based account, to a user associated with the second user device.

17. The first user device of claim 11, wherein the communication session with the second user device comprises a wireless local area network connection.

18. The first user device of claim 11, wherein the set of actions further includes:
causing the second user device to be blacklisted on the first user device to prevent the second user device from further accessing the network; or
providing, to the trust platform, a suggestion to blacklist the second user device on the trust platform.

19. The first user device of claim 11, wherein the request to communicatively couple to the first user device is received based on hotspot data broadcast by the second user device.

20. The first user device of claim 11, wherein the notification includes:
information regarding a location of the second user device.

21. The first user device of claim 11, wherein:
the network includes a wireless local area network; and the wireless local area network corresponds to a hotspot activated by the first user device.

\* \* \* \* \*